(12) United States Patent
Kilby

(10) Patent No.: US 8,253,337 B2
(45) Date of Patent: Aug. 28, 2012

(54) LIGHTING SYSTEM

(75) Inventor: Ross Michael Kilby, Gillingham (GB)

(73) Assignee: AeroGlow Ltd., Dorset (GB)

( * ) Notice: Subject to any disclaimer, the term of this patent is extended or adjusted under 35 U.S.C. 154(b) by 346 days.

(21) Appl. No.: 12/544,269

(22) Filed: Aug. 20, 2009

(65) Prior Publication Data

US 2011/0018438 A1    Jan. 27, 2011

(30) Foreign Application Priority Data

Jul. 24, 2009  (GB) .................................. 0912903.2

(51) Int. Cl.
    *B60Q 1/14* (2006.01)
(52) U.S. Cl. ............ 315/77; 315/291; 362/34; 362/470; 340/580; 340/539.22
(58) Field of Classification Search .................. 315/307, 315/97, 194, 291, DIG. 4, 199, 225, 226; 363/16, 60; 340/905, 901, 580, 581
See application file for complete search history.

(56) References Cited

U.S. PATENT DOCUMENTS

| | | | |
|---|---|---|---|
| 4,365,232 A | 12/1982 | Miller | |
| 4,597,033 A | 6/1986 | Meggs et al. | |
| 6,099,136 A * | 8/2000 | Becnel | 362/34 |
| 6,556,903 B2 * | 4/2003 | Chinigo et al. | 701/33.7 |
| 7,703,956 B2 * | 4/2010 | Wentland et al. | 362/470 |
| 7,880,767 B2 * | 2/2011 | Chinigo | 348/148 |
| 7,928,664 B2 * | 4/2011 | Beland | 315/276 |
| 2007/0040672 A1 * | 2/2007 | Chinigo | 340/539.22 |

FOREIGN PATENT DOCUMENTS

| | | |
|---|---|---|
| WO | WO-98/38455 A1 | 9/1998 |
| WO | WO-99/10234 A1 | 3/1999 |

* cited by examiner

*Primary Examiner* — Shawki Ismail
*Assistant Examiner* — Christopher Lo
(74) *Attorney, Agent, or Firm* — Tarolli, Sundheim, Covell & Tummino LLP

(57) ABSTRACT

A lighting system for an emergency exit from an occupied space: an array of lighting elements located around the emergency exit to illuminate the exit and facilitate egress for an occupant of the space; a control unit; and sensors to detect one or more trigger conditions and actuate the lighting elements in response to a first trigger condition from any of the sensors, the sensors comprising: an impulse detector operable to send a signal to the control unit indicating that the impulse detector has experienced an impulse; and a roll and/or pitch detector operable to send a signal to the control unit indicating that the roll and/or pitch detector has experienced roll and/or pitch, wherein upon detection of the first trigger condition the control unit actuates one or more of the lighting elements to illuminate the exit.

29 Claims, 3 Drawing Sheets

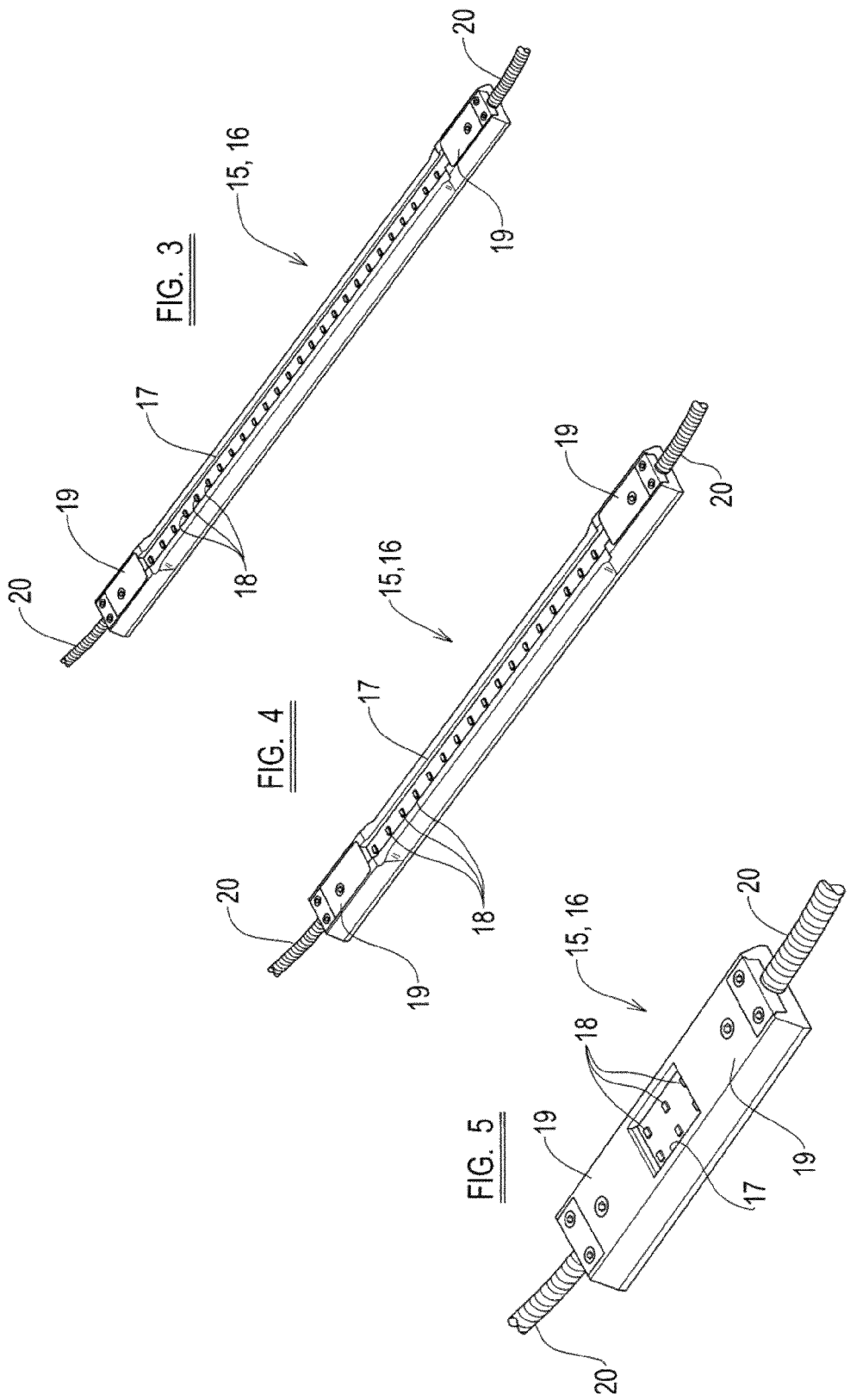

LIGHTING SYSTEM

FIELD OF THE INVENTION

The present invention relates to a lighting system.

BACKGROUND OF THE INVENTION

The lighting system is particularly for use in military vehicles to illuminate and identify a vehicle exit. Application of the system is not limited to military vehicles and extends to non-military vehicles such as utility vehicles like fire fighting equipment, oil field vehicles and mining excavators and vehicles.

Vehicles have a number of doors and windows, in the case of military and utility vehicles, there are also hatches, some of which are especially suited or designated as emergency exits. The occupants of the vehicle, in the event of an emergency which calls for an evacuation, must be able to identify an illuminated emergency exit and make a safe exit through the exit.

It is known for aircraft emergency exits to be signposted by illuminated signs over the exit and also to provide track lighting along the floor of an aircraft to lead occupants toward the nearest exit. Systems are also known which identify exits which have been opened anddirect occupants towards an opened exit and away from unopened, perhaps blocked exits.

Such systems do not offer protection or assistance to occupants who wish to escape a vehicle which has suffered an extreme movement, is in an extreme condition or in an immobilised vehicle, particularly when caused by military action. The problem is to improve exit illumination systems, particularly for vehicles operating in a military theatre. An additional problem is to improve emergency exit illumination in response to a vehicle suffering an extreme movement, or being immobilised in an extreme condition.

The present invention seeks to provide an improved exit illumination system.

SUMMARY OF THE INVENTION

The present invention provides a lighting system according to the appended claims. The present invention further provides a vehicle fitted with the lighting system according to the appended claims.

BRIEF DESCRIPTION OF THE DRAWINGS

Embodiments of the present invention will now be described, by way of non-limiting example only, with reference to the accompanying figures, in which:

FIGS. 3, 4 and 5 are perspective views of a lighting element embodying the present invention.

DESCRIPTION OF EXAMPLE EMBODIMENTS

Figure 1:
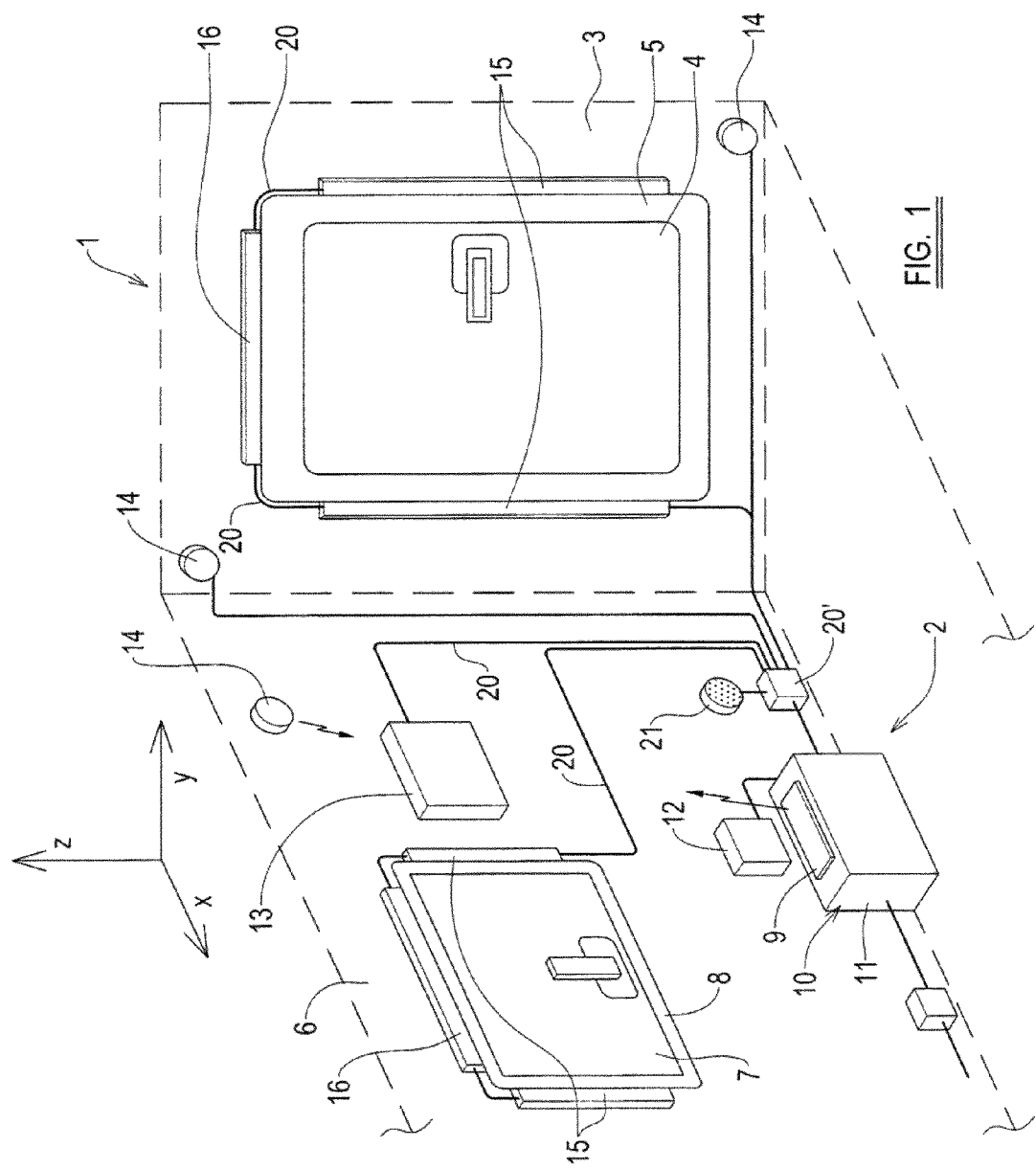
FIG. 1 illustrates a schematic representation of a lighting system embodying the present invention fitted in a military vehicle.

FIG. 1 shows the interior of a vehicle 1 fitted with a lighting system 2 embodying the present invention. The vehicle 1 is a military vehicle in this example and is therefore armoured and has a number of entry and exit points. In this example, a rear wall 3 of the vehicle 1 has a door 4 and a frame 5, the door 4 is a designated entry and exit point. A side wall 6 of the vehicle has a hatch 7 and a frame 8: the hatch is a designated exit point.

The lighting system 2 has various components distributed in the vehicle 1. An electronic control unit 9 is housed in a central unit casing 10 which also houses a power pack in the form of a standalone battery 11. One or more sensors 12, 13, 14 may also be provided in the central unit casing 10 but in this example, all of the sensors 12, 13, 14 are located remotely from the central unit 10 and are distributed around the vehicle.

The sensors 12, 13, 14 are shown hardwired to the electronic control unit 9 but in other examples, wireless connections can be utilised.

Whilst there are advantages to having a central unit 10 housing most of the components, such as space saving and reducing wire clutter in the close confines of a vehicle, there are advantages also in using a distributed system in which the components of the lighting system are remote from the central unit 10. For example, in the event of one sensor being disabled in one area, other sensors remote from the disabled sensor can take over the function of the disabled sensor.

In this example, there are two exits 4, 7 each of which is provided with an array of lighting elements 15, 16 located around the emergency exit to illuminate the exit and facilitate egress for an occupant of the vehicle. The door 4 is surrounded by three elongate strips of LED lighting 15, 16 housed in a ruggedized casing mounted onto the frame 5 of the exit. The array of lighting elements 15, 16 comprises two strips 15 on either side of the door 4 parallel to the frame 5 and a third strip 16 above the top of the door frame 5. The strips 15, 16 are arranged asymmetrically about the door 4 so that an occupant of the vehicle can determine the orientation of the door should an extreme event occur. The particular example of the asymmetric pattern used here is to arrange the lighting elements 15, 16 in the shape of an upturned U.

FIG. 3 shows a lighting element 15, 16 in more detail. Each element is an elongate channel 17 with a series of LEDs 18 located in the bottom of the channel and evenly spaced out along the channel. The recessed nature of the channel 17 protects the LEDs 18. Each end of the channel 17 terminates in a mounting block 19 housing any electrical terminals and allowing coupling of a power cable 20 which is, in turn, coupled to another lighting element 15, 16, a junction box 20' or directly back to the electronic control unit 9.

FIGS. 4 and 5 are examples of other lighting strips 15, 16 in which like reference numerals designate like components. The strip in FIG. 5 is relatively short compared to the strips of FIGS. 3 and 4 and has a 2×3 array of LEDs rather than a 1×n array as in FIGS. 3 and 4 (n is greater than 3). The strips 15, 16 are very low profile, substantially flush elements and have chamfered sides to minimize any risk of snagging on entering or exiting personnel.

The second exit from the vehicle in this example is the hatch 7. The hatch 7 has a similar array of lighting elements 15, 16 disposed around it. The array in this example comprises two strips 15 either side of the hatch sides 14 and a further horizontal strip 16 above the top of the hatch 17. The array is mounted to or around the frame 8 of the hatch 7.

There are three sensors 12, 13, 14 attached to the electronic control unit 9 and comprise, in this example, an impulse detector 12, a roll or pitch detector 13 and a water immersion detector 14.

The impulse detector 12 is operable to send a signal to the control unit 9 indicating that the impulse detector 12 has experienced an impulse, in the form of a blast or severe acceleration experienced by the vehicle outside the normal operating conditions of the vehicle. The impulse or blast detection is the recognition of the vehicle undergoing a significant shock pulse transmitted through the vehicle structure to, the impulse detector 12. For this reason, the impulse detector 12 is rigidly mounted and attached to a structural part of the vehicle 1, either the chassis or some other solid rigid structural element of the vehicle 1. In normal operation the vehicle will undergo many impulses or shocks such as vigorous vibrations from potholes, incoming rounds from hostiles and recoil and vibration from outgoing rounds from any weaponry mounted on the vehicle. The vehicle may be loaded with heavy articles which cause vibrations and the vehicle may be towing another vehicle or being towed itself in which case all these activities may give rise to further vibrations in normal operation. These vibrations and impulses experienced by the structure of the vehicle in normal operation are less than 50 g but 99% of the time are less than 20 g (20×9.81 m/sec$^2$) and so this (20 g) is the level to which the electronic control unit 9 is set to use as a threshold for impulse detection.

A high impulse shock such as a device exploding under or adjacent the vehicle which should cause a trigger condition could be in the region of 500 g. Thus, there is ample safety margin to prevent premature triggering between the threshold level (20 g) and the likely trigger event (up to 500 g). Any impulse (force×time) gives rise to vehicle acceleration. Acceleration g(acceleration)' is the most reliable way to measure extreme movement using an omni-directional g-sensor or accelerometer.

The impulse detector 12 is in the form of an accelerometer or g-sensor. It is important that the detector is omni-directional. Any extreme movement over the threshold is detected and causes the first trigger condition.

The actual thresholding can be done at the impulse detector so that the impulse detector 12 only sends a signal to the electronic control unit 9 when the impulse is greater than the selected threshold. Alternatively, the impulse detector 12 may send readings continuously to the electronic control unit 9 and the electronic control unit only reacts when a signal is received indicative of an impulse being greater than the selected threshold. Whichever mechanism is used for thresholding, the electronic control unit 9 makes a determination from the signal from the impulse detector 12 that there has been a trigger condition and the threshold is exceeded.

The other sensor which must be present is the roll and/or pitch detector 13 which is operable to send a signal to the control unit 9 indicating that the roll and/or pitch detector 13 has experienced roll and/or pitch above a threshold level or angle. The roll or pitch threshold may be either one of or a combination of angle of roll rotation and angle of pitch rotation. The threshold or thresholds are set with reference to a level condition so that should the vehicle roll over onto its side or back or pitch forward onto its nose or rear by an extreme amount, then these extreme movements of the vehicle will be detected and establish a second trigger condition, independent of the first trigger condition, which is another form of extreme movement of the vehicle, rolling or pitching past a threshold level and causing the second trigger condition. In some examples the roll or pitch detector 13 is configured as only a roll detector 13' or only a pitch detector 13". It is not essential to have both a roll and a pitch detector. It is essential to have either a roll detector or a pitch detector.

It is essential that both forms of extreme movement detection are provided in the system embodying the invention when used on a vehicle. Either detector 12, 13 exceeding a threshold level determined to set the envelope of normal vehicle operation, and movement and orientation will result in a trigger condition which will cause the electronic control unit 9 to illuminate the lighting strips 15, 16 powered by the battery 11.

In one example, destruction of either of the primary detectors 12; 13 causes a trigger condition.

In the event of the lighting system 2 being triggered, the array of LED lighting strips 15, 16 illuminate the surrounds of the exit points from the vehicle so as to guide vehicle occupants towards the exits. Because the array of lighting elements 15, 16 around the exit points are arranged in an asymmetric manner, the occupants can determine the orientation of the exit points should the vehicle have rolled over or the occupants become disoriented. The lighting system can also be used to illuminate other emergency escape equipment such as spare air supplies, handles to hatches and the like. The longer elongate strips of FIGS. 3 and 4 are useful to illuminate door or hatch exits. The block strip shown in FIG. 5 is useful to illuminate the head of a narrow opening or a specific item, such as a spare air supply.

The LEDs 18 in each of the lighting strip 15, 16 are high intensity night vision goggle friendly LEDs which penetrate through dense smoke and murky water. The LEDs operate at 7000 cd/m$^2$ but because they are night vision goggle friendly, they will not "bloom" goggles.

The power supply unit for the lighting system is preferably a standalone battery 11 in the central housing casing 10 but can be integrated with the vehicle power supply so that no battery is required.

Using a standalone battery 11, the battery and the function of the lighting system should be checked on a monthly basis and the battery changed annually.

Another sensor 14 which may be provided with the system is a water immersion detection sensor 14 which sends a trigger condition to the electronic control unit 9 when the water immersion sensor is immersed in water.

The water immersion sensors 14 (there are preferably many sensors 14) are located around the interior of the vehicle, preferably in the corners so that the electronic control unit can make a determination as to which parts of the vehicle are submerged and which parts are free from water. The electronic control unit 9 can also provide an analysis and make a determination about which exits are clear from water and illuminate those. In other example, all exits are always illuminated, whether they are detected as being under water or not.

FIG. 1 shows another secondary sensor, a smoke detector 21, which can also provide a trigger condition upon smoke in the vehicle 1 exceeding a threshold level. Smoke detectors are preferably distributed around the vehicle.

Figure 2B:
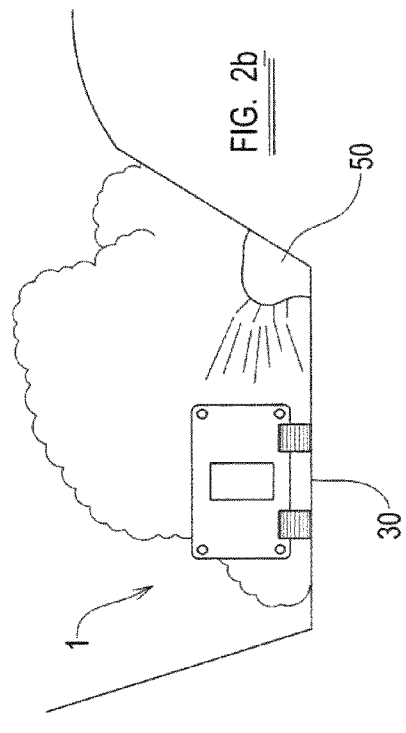
FIGS. 2a to 2d illustrate schematically vehicles fitted with the lighting system embodying the present invention in various conditions.
Figure 2D:
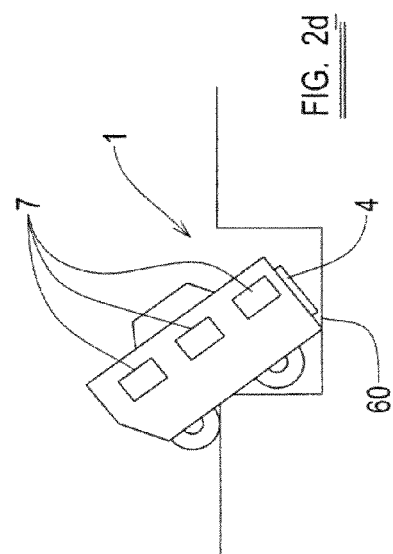
Figure 2A:
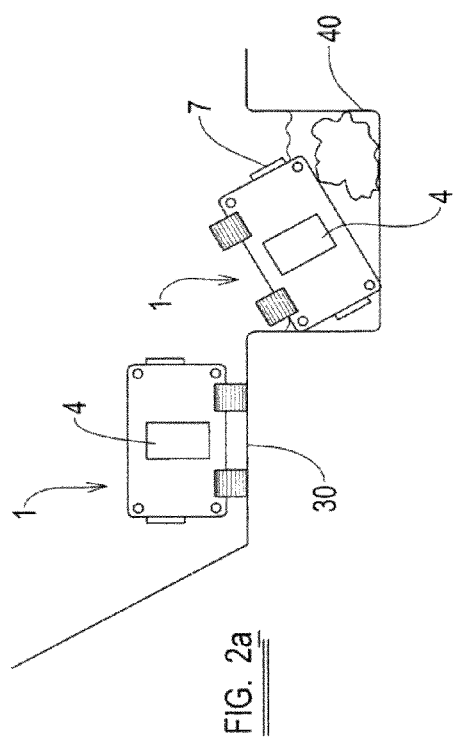
Figure 2C:
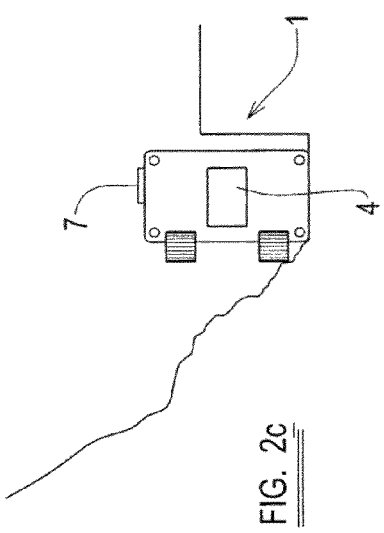

Referring now to FIGS. 2A through to 2D, vehicles 1 fitted with lighting systems 2 embodying the present invention are shown in various conditions.

In the first scenario (2A) a convoy of vehicles 1 has proceeded down a road 30 adjacent a parallel waterway 40 and the first vehicle in the convoy has weakened the road. The second vehicle in the convoy has slipped from the weakened road 30 and rolled into the waterway 40 and is partially submerged. The submerged vehicle has rolled through 140° or so. The lighting system 2 inside the vehicle will have been triggered by the electronic control unit 9 and illuminated by the battery power pack in response to the first of two trigger conditions which would have been received by the electronic control unit 9. The first trigger condition would have been from the roll and/or pitch detector 13 identifying the rolling of the vehicle past an 80° or 90° threshold before it made contact with water. The second trigger condition would have been the water immersion detector 14 activating the system as any one of the sensors 14 in the vehicle became immersed in water. The emergency lighting system 2 illuminates the frames of the exits allowing an occupant to identify the exit, its orientation and make safe passage to and through the exit.

In this first scenario, the vehicle has been immobilised by the extreme movement of the vehicle through a rollover and further by immersion in water.

In the second scenario (2B), a mine 50, improvised explosive device or perhaps a projectile device has exploded adjacent the vehicle 1 and immobilised the vehicle. The vehicle 1 has become a stationery target and is possibly filled with smoke and the occupants inside may be wounded from percussion, shrapnel or other trauma. The extreme movement of the vehicle in response to the shock blast will have triggered the impulse detector 12 into sending a trigger condition to the electronic control unit 9 causing the electronic control unit 9 to activate the lighting 15,16 powered by the standalone battery pack.

In the third scenario (2C), the vehicle has been immobilised and rolled onto its side. This extreme movement has been brought about by a landslide. The emergency lighting system 2 will have been triggered by the extreme movement of the rollover to 90° and all the exits 4,7 in the vehicle 1 will be illuminated for safe egress by the occupants. In this example, both the door 4 and hatch 7 of the vehicle provide exit points. The roll detector 13' will have exceeded its threshold roll angle and triggered the electronic control unit 9 to activate the lighting.

In the fourth scenario (2D), the vehicle has pitched backwards into a depression 60 and is grounded unable to obtain purchase with its wheels in the depression. The rear door 4 of the vehicle is pinned shut by the weight of the vehicle so the only safe exits are through hatches 7 at the side of the vehicle 1. There will also be exits on the top surface of the vehicle. In this example, the pitch detector 13' or the roll and pitch detector 13 has exceeded its threshold pitch angle and triggered the emergency lighting system.

Triggering of the emergency lighting system surrounding each of the doors of exits in response to the vehicle undergoing extreme movement conditions presents a significant improvement over existing exit illumination systems.

Hardwired connection 20 is illustrated between sensors 12, 13, 14, 21 and the electronic control unit 9. Wireless connection between sensors and the control unit is also available. A sensor 14 is shown in FIG. 1 in wireless communication with the electronic control unit 9.

All the components of the lighting system have been blast tested at 500 g—so the system is blast proof for up to 500 g. Every component within the system was blast tested to this level.

The components of the lighting system can be adhesively mounted to interior surfaces of the vehicle using Click Bond CB200-40 (™ of Click Bond, Inc.). Components can also be mounted using anchor points provided in the vehicle. This method of fixing the lighting components to the vehicle was also successfully blast tested at 500 g.

The lighting system in some examples comprises one or more externally mounted beacons triggered at the same time and by the same mechanisms as the lighting elements 15, 16 inside the vehicle. The externally mounted beacon is useful for personnel to locate the afflicted vehicle in dark or in murky waters. Examples of beacons are shown at the rear of the vehicles, in the corners in FIG. 2A to 2D.

On the electronic control unit 9 and battery pack 10, there is a three position latching switch: ON—the lighting is permanently on; OFF—the lighting is off and will NOT be triggered; and ARMED—the lighting will illuminate immediately on being triggered.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A lighting system for an emergency exit from an occupied space:
    an array of lighting elements locatable around the emergency exit to illuminate the exit and facilitate egress for an occupant of the space;
    sensors to detect one or more trigger conditions; and
    a control unit to actuate the lighting elements in response to a first trigger condition from any of the sensors, the sensors comprising: an impulse detector operable to send a signal to the control unit indicating that the impulse detector has experienced an impulse; and a roll and pitch detector operable to send a signal to the control unit indicating that the roll and pitch detector has experienced roll and/or pitch, wherein upon detection of the first trigger condition the control unit actuates one or more of the lighting elements to illuminate the exit, wherein the roll and pitch detector is operable to send a signal to the control unit only when a sensed roll and/or pitch is greater than a selected threshold roll and/or pitch, and wherein the thresholds for roll and pitch are independently selectable.

2. The lighting system of claim 1, wherein one or more of the lighting elements is an elongate strip of LEDs housed in a ruggedised transparent casing mounted onto the surround of the emergency exit, the casing presenting a flush or rounded profile to minimize snagging the casing on an occupant entering or exiting through the emergency exit.

3. The lighting system of 1 in combination with a vehicle, wherein the array of lighting elements are located around the emergency exit of the vehicle to illuminate the exit and facilitate egress from the vehicle by an occupant of the vehicle.

4. The lighting system of claim 1, wherein the array of lighting elements is arranged asymmetrically around the emergency exit to indicate the orientation of the exit.

5. The lighting system of claim 1, wherein the array of lighting elements is arranged as an illuminated arch over the exit.

6. The lighting system of claim 1, wherein a water detector is provided and is operable to send a signal to the control unit indicating that the water detector is immersed in water.

7. The lighting system of claim 1, wherein one or more of the sensors are located remotely from a power pack housing.

8. The lighting system of claim 1, wherein one or more of the sensors are located on or in a power pack housing.

9. The lighting system of claim 1, wherein the impulse detector is operable to send a signal to the control unit only when a sensed impulse is greater than a selected threshold impulse.

10. The lighting system of claim 1, wherein there is a single threshold achievable by selected combinations of roll and pitch.

11. The lighting system of claim 1, wherein a central unit comprises the control unit and a power pack to power the lighting elements and the control unit to monitor the sensors.

12. The lighting system of claim 11, wherein the power pack is a standalone battery pack, independent of any other power source in the vicinity.

13. The lighting system of claim 1, wherein the impulse detector and the roll and pitch detector are housed together with the control unit.

14. The lighting system of claim 13, wherein the central unit houses the control unit, the impulse detector and the roll and pitch detector, any other sensors are remote from the central unit.

15. The lighting system of claim 14, wherein a smoke detector is provided and is operable to send a signal to the control unit indicating that there is smoke in the occupied space.

16. A lighting system for an emergency exit from an occupied space:
   an array of lighting elements located around the emergency exit to illuminate the exit and facilitate egress for an occupant of the space;
   a control unit; and
   sensors to detect one or more trigger conditions and actuate the lighting elements in response to a first trigger condition from any of the sensors, the sensors comprising:
   an extreme movement detector operable to send a signal to the control unit indicating that the extreme movement detector has experienced an extreme movement; and an extreme orientation detector operable to send a signal to the control unit indicating that the extreme orientation detector has experienced an extreme orientation of roll and pitch greater than a respective independently selectable threshold, wherein upon detection of the first trigger condition the control unit actuates one or more of the lighting elements to illuminate the exit.

17. A method of operating a lighting system in a vehicle for an emergency exit from the vehicle comprising:
   sensing an extreme movement outside normal vehicle operation and sending a trigger condition to a control unit if an extreme movement is experienced;
   sensing an extreme orientation of roll and pitch greater than a respective independently selectable threshold, outside normal vehicle operation and sending a trigger condition to the control unit if an extreme orientation is experienced;
   the control unit detecting a first trigger condition from any sensor; and
   illuminating an array of lighting elements located around the emergency exit to illuminate the exit and facilitate egress for an occupant of the vehicle from the vehicle.

18. The lighting system of claim 1, wherein the array of lighting elements are located adjacent the emergency exit in an interior of the occupied space.

19. The lighting system of claim 16, wherein the array of lighting elements are located adjacent the emergency exit in an interior of the occupied space.

20. The method of claim 17, wherein the array of lighting elements are located adjacent the emergency exit in an interior of the vehicle.

21. The lighting system of claim 1, wherein the roll and/or pitch detector is operable to send a signal to the control unit indicating that the roll and/or pitch detector has experienced both roll and pitch, wherein upon detection of the first trigger condition the control unit actuates one or more of the lighting elements to illuminate the exit, wherein the roll and/or pitch detector is operable to send a signal to the control unit only when both a sensed roll and pitch are greater than selected threshold rolls and pitches, and wherein the thresholds for roll and pitch are independently selectable.

22. The lighting system of claim 16, wherein the roll and/or pitch detector is operable to send a signal to the control unit indicating that the roll and/or pitch detector has experienced both roll and pitch, wherein upon detection of the first trigger condition the control unit actuates one or more of the lighting elements to illuminate the exit, wherein the roll and/or pitch detector is operable to send a signal to the control unit only when both a sensed roll and pitch are greater than selected threshold rolls and pitches, and wherein the thresholds for roll and pitch are independently selectable.

23. The method of claim 17, including the step of sensing an extreme orientation of both roll and pitch greater than respective independently selectable thresholds, outside normal vehicle operation and sending a trigger condition to the control unit if an extreme orientation is experienced.

24. The lighting system of claim 1, wherein the roll and pitch detector measures changes in the angular position of the roll and pitch detector and sends a signal to the control unit indicating that the roll and pitch detector has experienced roll and/or pitch.

25. The lighting system of claim 24, wherein the angular position of the roll and pitch detector includes an angle of roll rotation and an angle of pitch rotation.

26. The lighting system of claim 16, wherein the extreme orientation detector measures changes in the angular position of the extreme orientation detector and sends a signal to the control unit indicating that the extreme orientation detector has experienced an extreme orientation of roll and pitch.

27. The lighting system of claim 16, wherein the angular position of the extreme orientation detector includes an angle of roll rotation and an angle of pitch rotation.

28. The method of claim 17, wherein sensing an extreme orientation of roll and pitch comprises measuring changes in the angular position of the vehicle.

29. The method of claim 28, wherein measuring changes in the angular position of the vehicle comprises measuring an angle of roll rotation of the vehicle and measuring an angle of pitch rotation of the vehicle.

* * * * *